(12) United States Patent
Moshrefi et al.

(10) Patent No.: US 9,003,327 B2
(45) Date of Patent: Apr. 7, 2015

(54) PROACTIVE USER INTERFACE

(75) Inventors: Afshin Moshrefi, Newburyport, MA (US); Rahul Khushoo, Waltham, MA (US); Nader Gharachorloo, Ossining, NY (US); Hong Xiao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 376 days.

(21) Appl. No.: 13/247,405

(22) Filed: Sep. 28, 2011

(65) Prior Publication Data

US 2013/0080972 A1   Mar. 28, 2013

(51) Int. Cl.
*G06F 13/00* (2006.01)
*G06F 15/00* (2006.01)
*G06F 3/048* (2013.01)
(52) U.S. Cl.
CPC ..................................... *G06F 3/048* (2013.01)

(58) Field of Classification Search
CPC ........................................................ G06F 3/048
USPC ......... 715/808, 851, 853, 841, 840, 765–765; 709/223, 229
See application file for complete search history.

(56) References Cited

U.S. PATENT DOCUMENTS

| 7,899,592 B2* | 3/2011 | Yaqub ........................ 701/29.3 |
| 2008/0143548 A1* | 6/2008 | Grimmelmann et al. .. 340/691.5 |
| 2010/0199287 A1* | 8/2010 | Boda et al. ..................... 718/108 |

* cited by examiner

*Primary Examiner* — Kevin Nguyen (57) ABSTRACT

A system may include a computing device configured to provide a proactive user interface, the proactive user interface configured to selectively propose suggested actions when a user of the computing device is determined to be in a passive mode. The computing device may include a proactive user interface module configured to: wait for at least one event, determine whether trigger criteria are met based on the at least one event, and when the trigger criteria are met, propose a suggested action to the user based on the at least one event.

21 Claims, 5 Drawing Sheets

| Exercising | Driving | Time | Day | Location | Triggered Actions |
|---|---|---|---|---|---|
| FALSE | TRUE | 12:00 PM - 1:00 PM | Weekdays | | 1. Do you want suggestions for Lunch?<br>2. If Yes, search for restaurants for Lunch within local area.<br>3. Present listing of restaurants for Lunch.<br>4. If receive selection of restaurant, start navigation to selected restaurant. |
| FALSE | TRUE | | Weekend | Within 1 mile of Walmart, Home Depot, Market Basket | 1. Do you want to know about items on sale at <store>?<br>2. If Yes, search for items on sale at <store>.<br>3. Provide listing of items on sale.<br>4. Do you want to navigate to <store>?<br>5. If yes, navigate to <store>. |
| FALSE | TRUE | After 5:00 PM | Tuesday | | 1. Do you want to call your mother?<br>2. If Yes, dial "Mom" contact in address book. |
| TRUE | TRUE | 6:00 PM | Friday | | 1. Do you want to order Thai food?<br>2. Display Thai menu with favorite items highlighted.<br>3. If receive selection of items, dial favorite Thai restaurant and provide order to restaurant. |
| TRUE | FALSE | | | | 1. Do you want to invoke "Workout" playlist?<br>2. If yes, execute music player with "Workout" playlist. |

Trigger Criteria 145

FIG. 5

PROACTIVE USER INTERFACE

BACKGROUND

A goal when designing a user interface is to allow a user to efficiently control and view the status of the device. Thus, user interfaces allow operators of devices to communicate with those devices. Due to the needs of different users, a user interface for one user may not be optimal for use by a different user. Moreover, a user interface that is optimal for a user at one time may be difficult for that user to use at another time.

DETAILED DESCRIPTION

Active users approach a computing device with a focused purpose in mind. Such users give the computing device a significant percentage of their attention. As some examples, active users may direct their attention to a computing device for searching the Internet, sending or receiving email, composing a letter, or inputting information to retrieve directions to a destination location. While active users may be distracted from their task for short intervals of time, overall these users are seriously engaged with the computing devices with which they are interacting. In other words, active users are focused on the tasks they are attempting to perform with the computing device.

By comparison, passive users do not give a computing device a significant percentage of their attention. Often they are performing other tasks while using the computing device so their focus is divided. As some examples, passive users may be performing other tasks such as driving a car, moving around a house, operating machinery, or exercising.

User interfaces of communications devices are generally designed for active users. Because passive users are distracted, these user interfaces designed for active users tend to be suboptimal for passive users. For example, active user interfaces may require attentiveness of a passive user that is unrealistic or unsafe. Or, active user interfaces may require exploration or memory of non-evident features not possible when performing other tasks.

A proactive user interface may be designed for the needs of passive users. The proactive user interface may suggest actions based on one or more events or triggers, and may provide messages and alerts. As some examples, the proactive user interface may suggest actions based on certain trigger criteria, such as a schedule or a time of day; a calendar; a location; a speed or velocity; received news, traffic, weather, or delay information; voice, textual, or multimedia communications; or even a task list. The proactive user interface may interrupt an action being performed by the device due to indication of the suggested action based on the trigger criteria.

Because active users become passive, and because passive users become active, a communications device may further be configured to determine whether the user is active, and responsively switch between an active user interface and a proactive user interface based on the determination. Responsive to a determination that the user is an active mode, the user interface of the communications device may provide an active mode user interface. Responsive to a determination that the user is in a passive mode, the user interface of the communications device may instead provide a proactive user interface.

Additionally, the user interface may have multiple proactive modes. The different proactive modes may be selected based on what type of other activity the communication device determines the user to be performing. For example, a communications device may determine that a user is exercising based on motion of the communications device. Responsive to that determination, the communications device may provide a proactive user interface configured for a user who is exercising. As another example, the communications device may determine that the user is driving, such as based on changes made to the user's position as measured by a GPS device. Responsive to that determination, the communications device may provide a proactive user interface configured for a user who is operating a motor vehicle.

Figure 1:
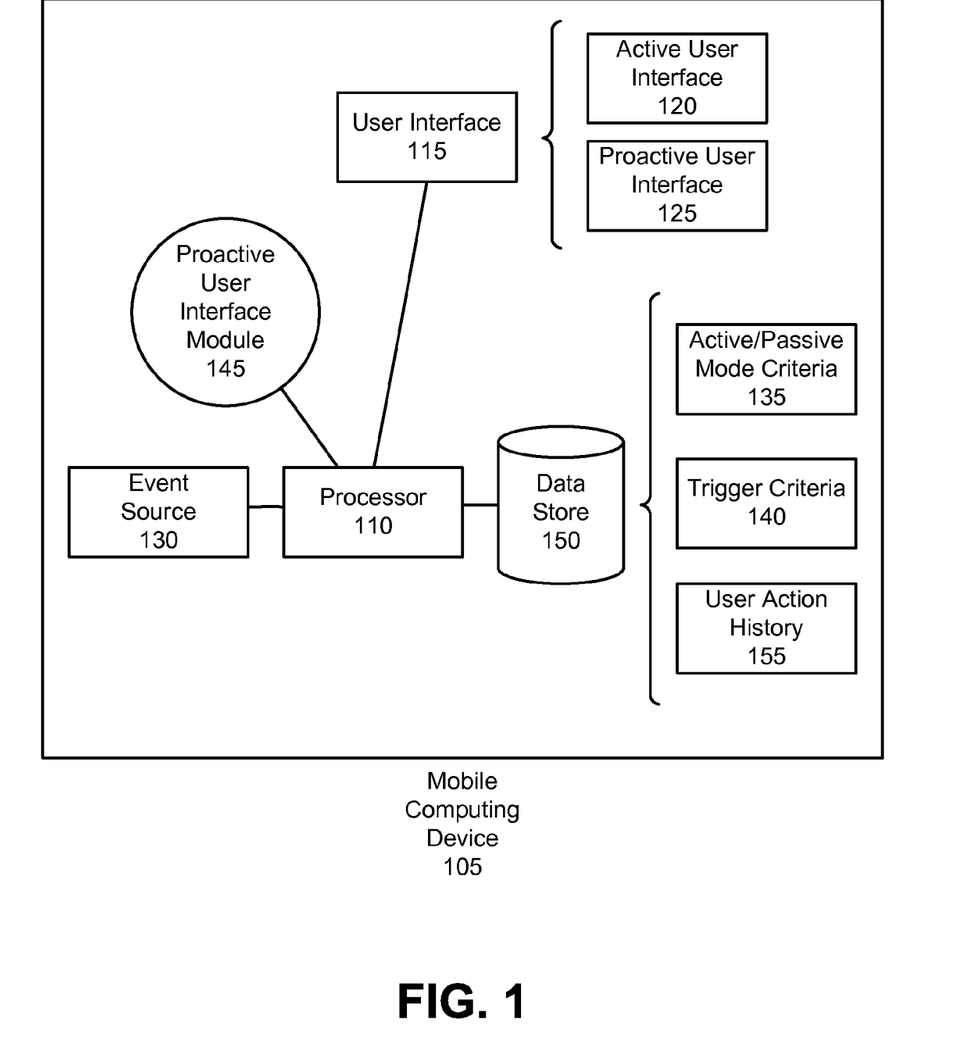
FIG. 1 illustrates an exemplary computing device configured to employ an active user interface and a proactive user interface.

FIG. 1 illustrates an exemplary mobile computing device 105 configured to employ an active user interface 120 and a proactive user interface 125. The mobile computing device 105 may be any of various types of devices, such as a mobile telephone, a pager, a tablet computer, a portable music player, a car computer, among other examples. The mobile computing device 105 may be implemented as a combination of hardware and software, and may include one or more software applications or processes for causing one or more computer processors 110 to perform the operations of the mobile computing device 105 described herein.

The mobile computing device 105 may include one or more user interface 115 components capable of receiving input from a user and providing output to the user. The user interface 115 components may allow for the operation and control of the functions of the mobile computing device 105. The user interface 115 may further provide feedback and other output to the user to aid the user in making operational decisions with respect to the mobile computing device 105. Exemplary user interfaces 115 may make use of hardware included in the mobile computing device 105, such as keyboards, buttons, and microphones, display screens and loudspeakers. The user interface 115 may be used to provide either an active user interface 120 or a proactive user interface 125.

An active user interface 120 may be designed for a user who can give the mobile computing device 105 at least a significant portion and maybe all of the user's attention. The active user interface 120 is typically provided to a user having a purpose in mind for the mobile computing device 105. An active user interface 120 may be suitable for a focused mission, where the user knows what he wants and is not interrupted by other tasks. As a consequence, such a user may be required to be knowledgeable about use of the active user interface 120 to accomplish the task.

A proactive user interface 125 may be designed for a user who is less focused. Such a user is potentially principally distracted and may be performing other tasks rather than actively engaged with the mobile computing device 105. Exemplary proactive user interfaces 125 may include informational displays or voice interfaces that provide guidance or suggestions to the user. For proactive user interfaces 125, operating the mobile computing device 105 is not necessarily the main mission of the user.

The mobile computing device 105 may further include one or more event sources 130 configured to provide information that may be used to determine whether to provide an active user interface 120 or a proactive user interface 125. As an example, an event source 130 may provide timing information such as the current day and/or time. As another example, an event source 130 may provide calendaring information, such as appointments. Or, an event source may provide global positioning system (GPS) information, such as a location position and/or a velocity of the mobile computing device 105. As yet another example, an event source 130 may include a component configured to receive alerts and alarms, such as alerts warning of inclement weather. In some instances, the user interface 115 may provide input as an event source 130 for user-initiated events.

The mobile computing device 105 may include active/passive mode criteria 135. The active/passive mode criteria 135 may specify conditions that, when satisfied, indicate whether to provide the active user interface 120 or the proactive user interface 125. As some examples, the active/passive mode criteria 135 may specify a transition from an active user interface 120 to a proactive user interface 125 based on a velocity of the mobile computing device 105, a location of the mobile computing device 105, a time of day, motion or shaking or other handling of the mobile computing device 105, or proximity to another device (such as by way of Bluetooth pairing information).

The mobile computing device 105 may further include trigger criteria 140 configured to define what suggestions or proposed actions to include in a proactive user interface 125 when the user interface is in a passive mode. Each proactive user interface 125 may have its own trigger criteria 140. In other cases, trigger criteria 140 may be shared across multiple proactive user interfaces 125 or mobile computing devices 105. The trigger criteria 140 may include combinations of events received from event sources 130 that, when met, cause an assigned action to be performed or suggested by the proactive user interface 125.

Exemplary trigger criteria 140 may include any of, or combinations of one or more of: a day, a time of day, a location, a speed, an alert, a notification, a task schedule, a communication, or a manual input. For example, one item of trigger criteria 140 may include a time of day and may only trigger for a proactive user interface 125 provided when a user is driving. Another one item of trigger criteria 140 for the same proactive user interface 125 may include a location of a user, and that the day is a weekday.

Exemplary actions triggered when the trigger criteria 140 are met may include one or more dialog prompts. These dialog prompts may be configured to request, confirm, or suggest certain actions to the user. For example, a triggered action may suggest that the mobile computing device 105 initiate a telephone call. As another example, a triggered action may suggest that the mobile computing device 105 retrieve a listing of items for user selection such as a list of local restaurants or a list of items on sale at a local store. The exemplary triggered actions may include multiple steps or prompts as well. For example, a triggered action may suggest to a user to display a listing of items that are on sale at a local store, and then may further ask the user if he or she wishes to be navigated to the store. As another example, a triggered action may suggest to a user to display a listing of local restaurants for lunch, may receive a selection of one of the listed restaurants, and may offer to navigate the user to the selected restaurant.

The mobile computing device 105 may include a proactive user interface module 145. The proactive user interface module 145 may be provided as software that when executed by the processor 110 provides the operations described herein. Alternatively, the proactive user interface module 145 may be provided as hardware or firmware, or combinations of software, hardware and/or firmware. As explained in detail below, the proactive user interface module 145 may be configured to determine whether to provide the active user interface 120 or the proactive user interface 125 based on active/passive mode criteria 135, to cause the mobile computing device 105 to transition among the active user interface 120 and one or more proactive user interface 125, to determine suggestions to give the user using trigger criteria 140 for the provided proactive user interface 125, and to implement the triggered actions when so requested by the user.

The data store 150 may include one or more data storage mediums, devices, or configurations, and may employ various types, forms, and/or combinations of storage media, including but not limited to hard disk drives, flash drives, read-only memory, and random access memory. The data store 150 may include various technologies useful for storing and accessing any suitable type or form of electronic data, which may be referred to as content. Content may include computer-readable data in any form, including, but not limited to video, image, text, document, audio, audiovisual, metadata, and other types of files or data. Content may be stored in a relational format, such as via a relational database management system (RDBMS). As another example, content may be stored in a hierarchical or flat file system. As yet another example, content may be stored in the form of extensible markup language (XML) files. Exemplary data that may be stored in the data store 150 include active/passive mode criteria 135 and trigger criteria 140, among other types.

In some instances the data store 150 may maintain a user action history 155 of the events and resultant actions performed by a user of the mobile computing device 105. This user action history 155 may be used to allow the proactive user interface module 145 to automatically formulate additional trigger criteria 140 to use when suggesting user actions. For example, if a user calls his mother at 6:00 PM on Tuesdays while driving, the proactive user interface module 145 may create a trigger criteria 140 entry configured to suggest that the user call his mother when the time becomes 6:00 PM on Tuesday. Through maintaining the user action history 155 and formulating additional trigger criteria 140, the proactive user interface module 145 may create a proactive user interface 125 tailored to the needs of the user of the mobile computing device 105.

In general, computing systems and/or devices, such as the mobile computing device 105, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as mobile computing device 105, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor (e.g., processor 110) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as data store 150, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The proactive user interface module 145 may be one such computer program product.

Figure 2:
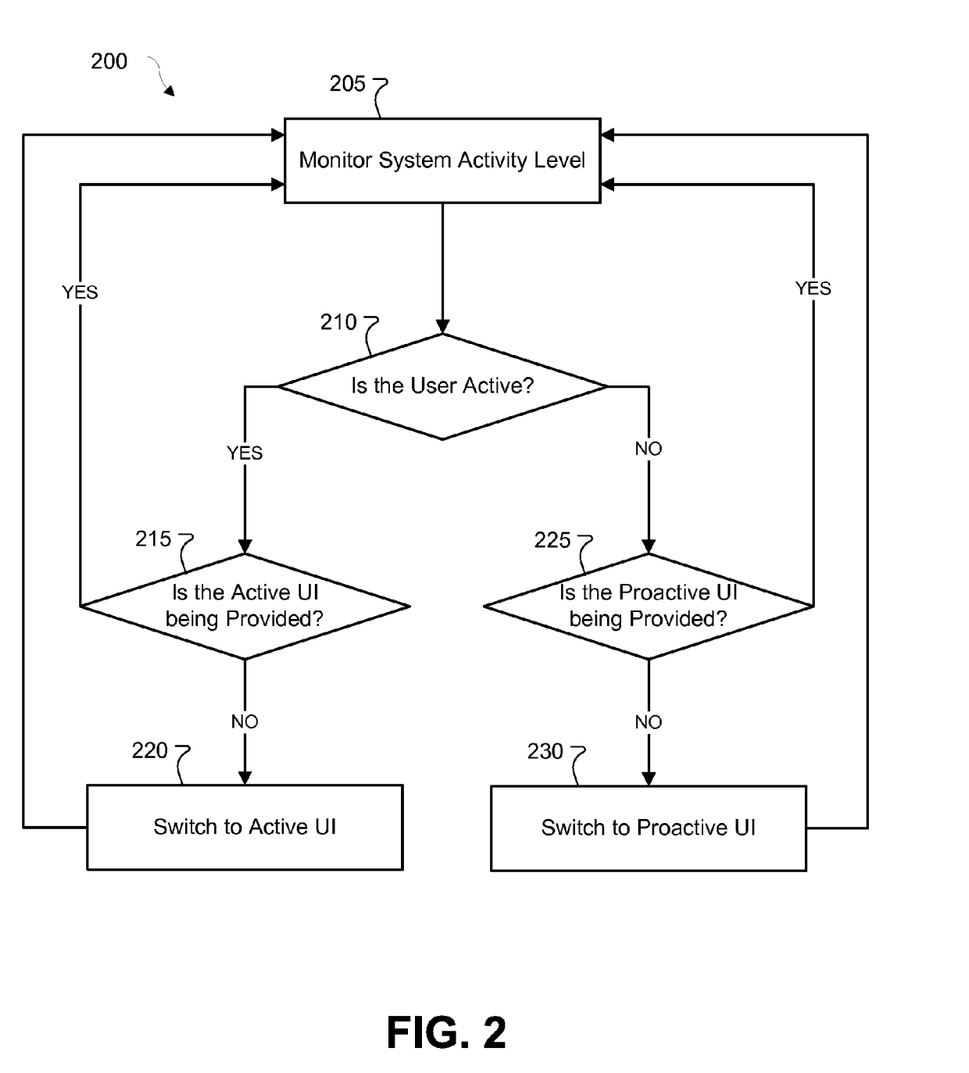
FIG. 2 illustrates an exemplary process for switching between an active user interface and a proactive user interface.

FIG. 2 illustrates an exemplary process 200 for switching between an active user interface 120 and a proactive user interface 125. The process 200 may be performed by various devices, such as by a mobile computing device 105 executing instructions of a proactive user interface module 145 using a processor 110.

In block 205, the mobile computing device 105 monitors system activity. For example, the proactive user interface module 145 may receive information from one or more event sources 130 of the mobile computing device 105. As some examples, the proactive user interface module 145 may receive GPS velocity information from a GPS event source 130, or may receive Bluetooth pairing information from a Bluetooth event source 130.

In decision point 210, the proactive user interface module 145 determines whether the user is in an active or passive mode. The proactive user interface module 145 may compare the information received from the one or more event sources 130 with the active/passive mode criteria 135. Based on the comparison, the proactive user interface module 145 may determine whether an active user interface 120 or a proactive user interface 125 should be provided. If the proactive user interface module 145 determines that an active user interface 120 should be provided, control passes to decision point 215. Otherwise, the proactive user interface module 145 determines that a proactive user interface 125 should be provided, and control passes to decision point 225. As an example of an instance where the proactive user interface module 145 determines that a proactive user interface 125 should be provided, the proactive user interface module 145 may determine that the user is busy based on GPS velocity information indicating the mobile computing device 105 is on the move. As another example, the proactive user interface module 145 may determine that the user is busy based on receiving Bluetooth pairing information indicating the mobile computing device 105 entered a vehicle.

In decision point 215, the proactive user interface module 145 determines whether the active user interface 120 is currently being provided. If the active user interface 120 is being provided, then no transitioning of the user interface 115 is required, and control passes to block 205. Otherwise, if the proactive user interface 125 is being provided, control passes to block 220.

In block 220, the proactive user interface module 145 transitions the user interface 115 to provide the active user interface 120. Next, control passes to block 205.

In decision point 225, the proactive user interface module 145 determines whether the proactive user interface 125 is currently being provided. If the proactive user interface 125 is being provided, then no transitioning of the user interface 115 is required, and control passes to block 205. Otherwise, if the active user interface 120 is being provided, control passes to block 230.

In block 230, the proactive user interface module 145 transitions the user interface 115 to provide the proactive user interface 125. For example, the proactive user interface module 145 may load the trigger criteria 140 associated with the proactive user interface 125. Next, control passes to block 205.

Figure 3:
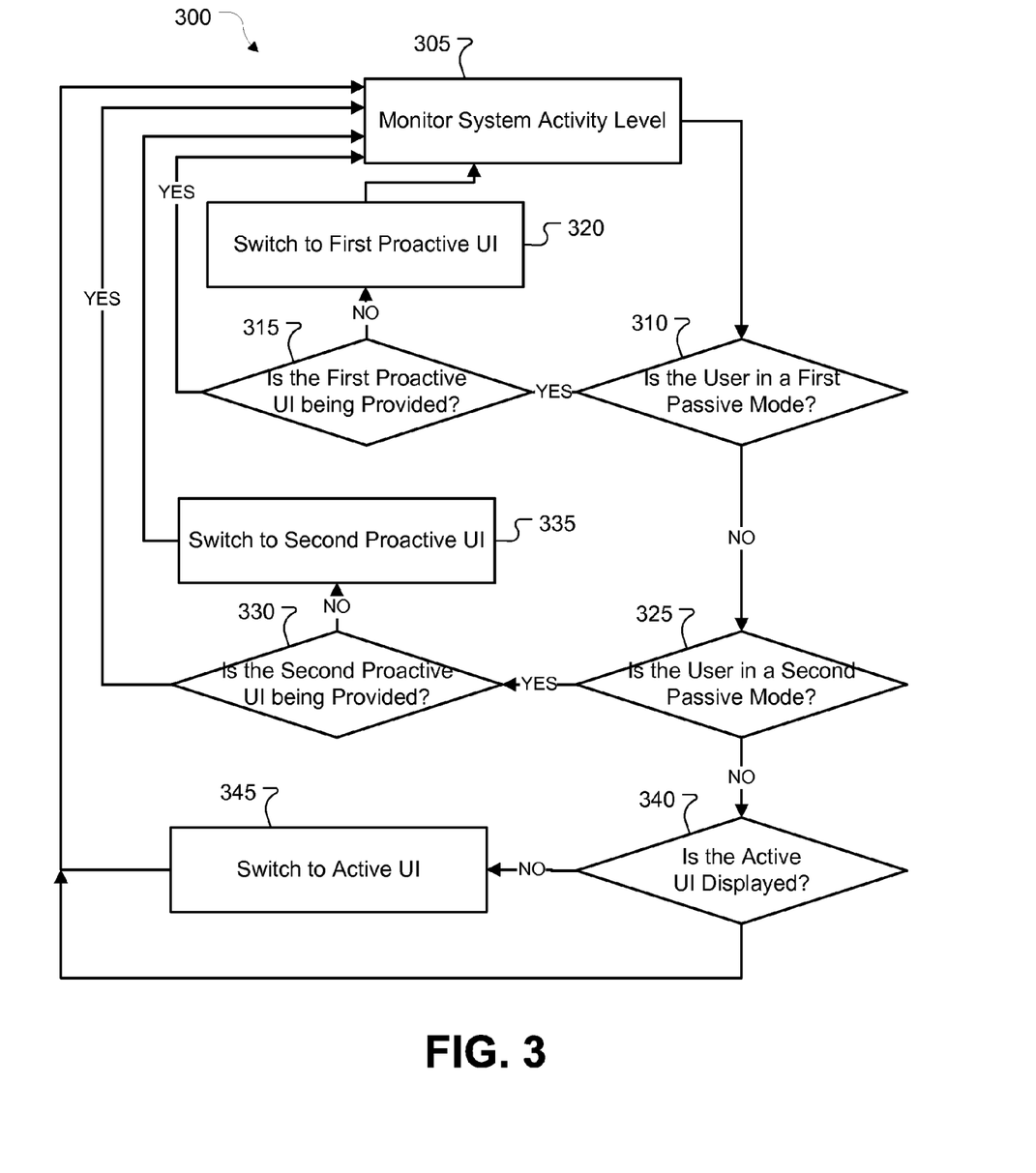
FIG. 3 illustrates an exemplary process for switching among an active user interface and multiple proactive user interfaces.

FIG. 3 illustrates an exemplary process 300 for switching between an active user interface 120 and multiple proactive user interfaces 125. Similar to the process 200, the process 300 may be performed by various devices, such as by the mobile computing device 105 executing instructions of the proactive user interface module 145 using a processor 110. In contrast to process 200, however, the process 300 illustrates an example including multiple proactive user interfaces 125.

In block 305, the mobile computing device 105 monitors system activity. For example, the proactive user interface module 145 may receive information from one or more event sources 130 of the mobile computing device 105.

In decision point 310, the mobile computing device 105 determines whether user is in a first passive mode. For example, the proactive user interface module 145 may compare the information received from the one or more event sources 130 with the active/passive mode criteria 135 associated with the first passive mode. Based on the comparison, the proactive user interface module 145 may determine whether a proactive user interface 125-A corresponding to the first passive mode should be provided. If the proactive user interface module 145 determines that the proactive user interface 125-A corresponding to the first passive mode should be provided, control passes to decision point 315. Otherwise, control passes to decision point 325.

In decision point 315, the proactive user interface module 145 determines whether the proactive user interface 125-A corresponding to the first passive mode is currently being provided. If the proactive user interface 125-A is being provided, then no transitioning of the user interface 115 is required, and control passes to block 305. Otherwise, a transition needs to be made, and control passes to block 320.

In block 320, the mobile computing device 105 transitions the user interface 115 to provide the first proactive user interface 125-A. For example, the proactive user interface module 145 may load from the data store 150 or otherwise activate the trigger criteria 140 associated with the first proactive user interface 125-A. Next, control passes to block 305.

In decision point 325, the mobile computing device 105 determines whether user is in a second passive mode. For example, the proactive user interface module 145 may compare the information received from the one or more event sources 130 with the active/passive mode criteria 135 associated with the second passive mode. Based on the comparison, the proactive user interface module 145 may determine whether a proactive user interface 125-B corresponding to the second passive mode should be provided. If the mobile computing device 105 determines that the proactive user interface 125-B corresponding to the second passive mode should be provided, control passes to decision point 330. Otherwise, control passes to decision point 340.

In decision point 330, the proactive user interface module 145 determines whether the proactive user interface 125-B corresponding to the second passive mode is currently being provided. If the proactive user interface 125-B is being provided, then no transitioning of the user interface 115 is required, and control passes to block 305. Otherwise, a transition needs to be made, and control passes to block 335.

In block 335, the proactive user interface module 145 transitions the user interface 115 to provide the second proactive user interface 125-B. For example, the proactive user interface module 145 may load from the data store 150 or otherwise activate the trigger criteria 140 associated with the second proactive user interface 125-B. Next, control passes to block 305.

In decision point 340, the proactive user interface module 145 determines whether the active user interface 120 is currently being provided. If the active user interface 120 is being provided, then no transitioning of the user interface 115 is required, and control passes to block 305. Otherwise, a transition needs to be made, and control passes to block 345.

In block 335, the proactive user interface module 145 transitions the user interface 115 to provide the active user interface 120. For example, the proactive user interface module 145 may unload or otherwise deactivate the trigger criteria 140 associated with any previously invoked proactive user interfaces 125. Next, control passes to block 305.

Using processes such as the process 200 and 300, the mobile computing device 105 may determine whether to provide a traditional active user interface 120 or one or more proactive user interfaces 125. When in the passive mode and the user is otherwise occupied, trigger criteria 140 may be loaded or activated to allow the proactive user interface 125 to suggest or otherwise proactively provide for actions to be performed.

Figure 4:
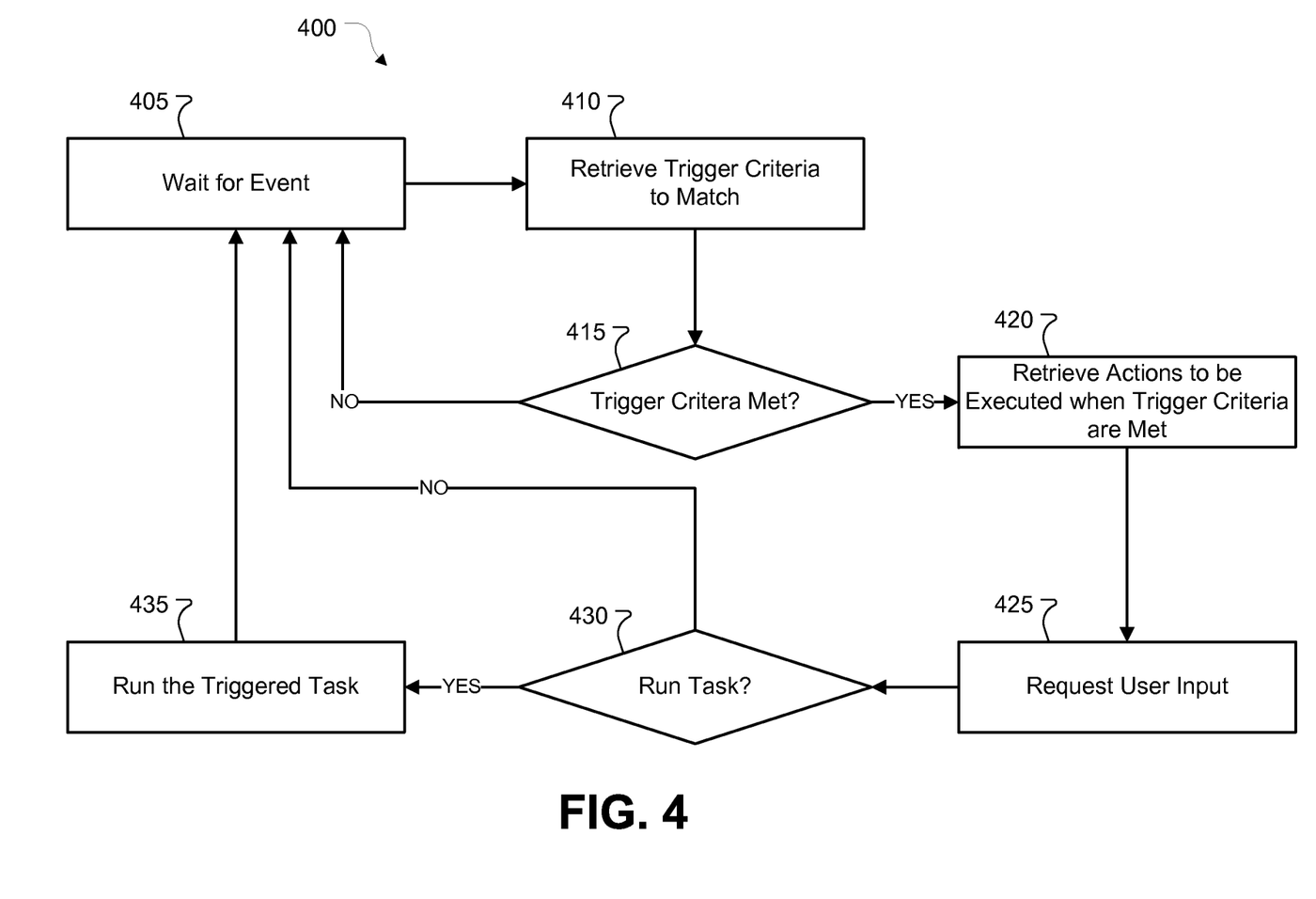
FIG. 4 illustrates an exemplary process for the triggering of actions to be provided on a proactive user interface.

FIG. 4 illustrates an exemplary process 400 for the triggering of actions to be performed on a proactive user interface 125. As with the processes 200 and 300, the process 400 may be performed by various devices, such as by the mobile computing device 105 executing instructions of a proactive user interface module 145 using a processor 110.

In block 405, the proactive user interface module 145 waits for an event. For example, the proactive user interface module 145 may have determined to provide a proactive user interface 125 via process 200 or 300 discussed above. While providing the proactive user interface 125, the proactive user interface module 145 may wait for a calendar event, such as a day, time of day, holiday, or appointment. As another example, the proactive user interface module 145 may wait for the mobile computing device 105 to move to a particular location or move in a particular direction or at a certain velocity. As yet another example, the proactive user interface module 145 may wait for an alert or alarm to signal, such as the receipt of an alert for inclement weather location. Or, the proactive user interface module 145 may simply receive an input from the user. In some instances, the proactive user interface module 145 may wait for the occurrence or nonoccurrence of one or more events.

In block 410, the proactive user interface module 145 retrieves the trigger criteria 140 to attempt to match to the monitored event or events. For example, the mobile computing device 105 may retrieve loaded or activated trigger criteria 140 associated with the current user of the mobile computing device 105. As another example, the mobile computing device may receive the latest available trigger criteria 140 for the proactive user interface 125.

In decision point 415, the proactive user interface module 145 determines whether any of the trigger criteria 140 are met. Based on the event information, the proactive user interface module 145 may search the trigger criteria 140 for any actions or suggestions that may have been triggered. For example, one trigger criteria 140 element may trigger as part of a proactive user interface 125 provided to users who are driving, and may trigger between 12:00 PM and 1:00 PM, and may cause the proactive user interfaces 125 to make lunch suggestions. If the user of the mobile computing device 105 is determined to be driving based on a location event, and if the time is determined to be between 12:00 PM and 1:00 PM based on a calendar event, the proactive user interface module 145 may determine that the mobile computing device 105 should inquire whether the user wishes to see suggestions for lunch locations. If a trigger criteria 140 element is met, then control passes to block 420. Otherwise, control passes to block 405.

In block 420, the proactive user interface module 145 retrieves the actions to be executed when the indicated trigger criteria 140 have been met. For example, the proactive user interface module 145 may locate the actions, including prompts to provide to the user, based on the indicated trigger criteria 140.

In block 425, the proactive user interface module 145 requests user input from the user. In many examples, the trigger criteria 140 indicate a suggestion to the user, but the user must agree to the suggestion before further actions are to take place.

In decision point 430, the proactive user interface module 145 determines whether the user desires to perform the triggered action. For example, the proactive user interface module 145 may present the user with the suggestion. Based on receiving an indication from the user to perform the action, such as an affirmative response from the user, control may pass to block 435. If no input is received from the user, or if a negative response is received from the user, control may instead pass to block 405.

In block 435, the proactive user interface module 145 runs the triggered action or suggestion. For example, based on user interface information or other instructions included in the trigger criteria 140, the proactive user interface module 145 may perform the triggered action or actions suggested by the proactive user interface module 145.

Figure 5:
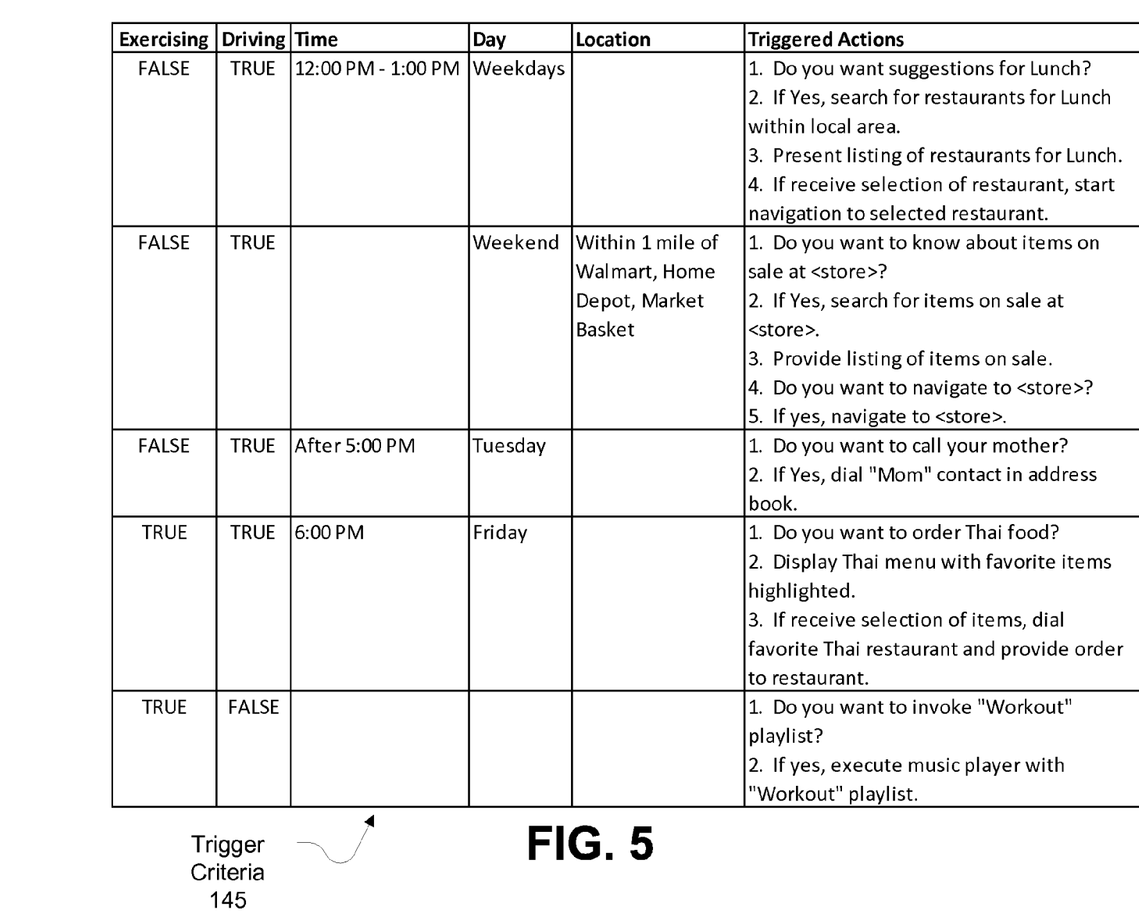
FIG. 5 illustrates exemplary mapping of trigger criteria for use by a proactive user interface module.

FIG. 5 illustrates exemplary mapping of trigger criteria 140 for use by a proactive user interface module. The exemplary mapping of trigger criteria 140 may be stored in the data store 150 of the mobile computing device 105. The first column of the mapping illustrates which trigger criteria 140 are applicable to a first proactive user interface 125-A. The second column of the mapping illustrates which trigger criteria 140 are applicable to a second proactive user interface 125-B. The third, fourth and fifth columns of the mapping illustrate values for event criteria that, when met, trigger the item of trigger criteria 140 represented by the row. The sixth column illustrates exemplary triggered actions that are performed when the trigger criteria 140 are met.

The illustrated mapping of trigger criteria 140 includes trigger criteria 140 applicable to an exercising proactive user interface 125-A and also criteria applicable to a driving proactive user interface 125-B. Only trigger criteria 140 that are applicable to a particular proactive user interface 125 can be triggered when in that proactive user interface 125 mode.

If a trigger criteria 140 item is applicable for a particular proactive user interface 125, then a value of TRUE is employed in the exemplary mapping. If a trigger criteria 140 item is not applicable for a particular proactive user interface 125, then a value of FALSE is employed. For example, the first three trigger criteria 140 items are applicable to the driving proactive user interface 125-B. Items of trigger criteria 140 may be applicable to multiple proactive user interfaces 125, and in such cases a value of TRUE may be employed in multiple proactive user interface 125 columns. For example the fourth item of trigger criteria 140 is applicable to both the exercising proactive user interface 125-A and also the driving proactive user interface 125-B. While two proactive user interfaces 125 are illustrated, mappings of trigger criteria 140 including more or fewer proactive user interfaces 125 are possible.

Similar to as discussed above with respect to elements 405, 410 and 415 of the process 410, the proactive user interface module 145 may wait for the occurrence or nonoccurrence of one or more events. These events may be received from one or more event sources 130 or from the user interface 115 itself. Based on the event information, the proactive user interface module 145 may search the trigger criteria 140 for any actions or suggestions that may have been triggered.

The third, fourth and fifth columns of the mapping illustrate values for event criteria that when met trigger the item trigger criteria 140. The third column indicates time values required to trigger of the item of trigger criteria 140. The fourth column indicates day values required to trigger of the item of trigger criteria 140. The fifth column indicates location values required to trigger of the item of trigger criteria 140. Empty column values indicate that any value for the particular column match the item of trigger criteria 140. For example, the first item of trigger criteria 140 is triggered when the time is between 12:00 PM-1:00 PM, the day is a weekday, and the location is anywhere. As another example, the second item of trigger criteria 140 is triggered at any time of day, on a day that is a weekend, and when the location is within one mile of a Wal-Mart, Home Depot, or Market Basket store.

Similar to as discussed above with respect to element 420 through 435 of the process 400, actions may be suggested or executed when trigger criteria 140 are met. The sixth column includes a list of actions to be performed when the associated row of trigger criteria 140 is triggered. In many examples, the list of suggested actions includes a request for user input to act as confirmation that the suggested action is to be performed. Moreover, in some examples the list of suggested actions may include multiple interactions with the user of the mobile computing device 105.

For example, a user of a mobile computing device 105 may begin driving. The proactive user interface module 145 of the mobile computing device 105 may accordingly receive information from one or more event sources 130 indicating that the user is driving. As some examples, the proactive user interface module 145 may receive GPS velocity information from a GPS event source 130, or may receive Bluetooth pairing information of a vehicle from a Bluetooth event source 130. Accordingly, similar to as discussed above with respect to processes 200 and 300, the proactive user interface module 145 may transition the user interface to a driving proactive user interface 125-B, and may load or otherwise activate the trigger criteria 140 associated with the driving proactive user interface 125-B.

Similar to as discussed above with respect to process 400, the proactive user interface module 145 may receive event indications that the time of day is after 5:00 PM and that the day of the week is Tuesday. The time of day and day of week information may be received from a calendaring event source 130. Accordingly, proactive user interface module 145 may suggest via the proactive user interface 125-B for the user to call his mother. If the user agrees, then the proactive user interface module 145 will cause the mobile computing device 105 to dial the telephone number associated with the "Mom" contact in the user's address book.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a computing device configured to provide a proactive user interface, the proactive user interface configured to selectively propose suggested actions when a user of the computing device is determined to be in a passive mode, the computing device including a proactive user interface module configured to:
wait for at least one event,
determine whether trigger criteria are met based on the at least one event,
when the trigger criteria are met, propose a suggested action to the user based on the at least one event; and
perform the suggested action if an affirmative response is received from the user.

2. The system of claim 1, wherein the computing device is further configured to:
monitor activity of the computing device;
determine whether to provide the proactive user interface based on the monitored activity and mode criteria that specify conditions that, when satisfied, indicate that the user is in the passive mode;
provide an active user interface configured to receive user input when the user is determined not to be in the passive mode, and
provide the proactive user interface when the user is determined to be in the passive mode.

3. The system of claim 1, wherein the computing device is further configured to:
switch to the active user interface when the user is not in the passive mode and the active user interface is not being provided;
switch to the proactive user interface when the user is in the passive mode and the proactive user interface is not being provided.

4. The system of claim 3, wherein switching to the proactive user interface includes at least one of loading trigger criteria from a data store and activating trigger criteria associated with the proactive user interface.

5. The system of claim 1, wherein the computing device is further configured to:
switch the user interface to the proactive user interface when the user is in the passive mode;
switch the user interface to a second proactive user interface when the user is in a second passive mode; and
switch the user interface to an active mode when the user is not in the passive mode or the second passive mode.

6. The system of claim 1, wherein the computing device is a mobile computing device and the at least one event includes at least one of: timing information, calendaring information, global positioning system information, alert information, device pairing information, and user-initiated event information.

7. The system of claim 1, wherein the trigger criteria include values for waited events that, when met, trigger a list of actions to be performed by the computing device.

8. The system of claim 7, wherein the computing device is a mobile computing device and values for waited events include at least one of: a day, a time of day, a location, a speed, an alert, a notification, a task schedule, a communication, a manual input.

9. The system of claim 1, wherein the proactive user interface is provided when a user of the computing device is determined to be at least one of driving and exercising.

10. The system of claim 1, wherein the computing device is further configured to:
maintain a user action history of events and resultant actions performed by the user; and
formulate additional trigger criteria based on the events and resultant actions.

11. A method, comprising:
providing an active user interface by a computing device, the active user interface configured to receive user input when a user of the computing device is not determined to be in a passive mode;
providing a proactive user interface by the computing device, the proactive user interface configured to selectively propose suggested actions when the user is determined to be in a passive mode; and
when providing the proactive user interface:
waiting for at least one event;
determining whether trigger criteria are met based on the at least one event;
when the trigger criteria are met, proposing a suggested action to the user based on the at least one event; and
performing the suggested action if an affirmative response is received from the user.

12. The method of claim 11, further comprising:
monitoring activity of the computing device;
determining whether to provide the proactive user interface based on the monitored activity and mode criteria that specify conditions that, when satisfied, indicate that the user is in the passive mode;
providing the active user interface when the user is determined not to be in the passive mode; and
providing the proactive user interface when the user is determined to be in the passive mode.

13. The method of claim 11, further comprising, when switching to the proactive user interface, at least one of loading trigger criteria from a data store and activating trigger criteria in the data store.

14. The method of claim 11, wherein the at least one event includes at least one of: timing information, calendaring information, global positioning system information, alert information, device pairing information, and user-initiated event information.

15. The method of claim 11, wherein the trigger criteria include values for waited events that, when met, trigger a list of actions to be performed by the computing device.

16. The method of claim 15, wherein the values for waited events include at least one of: a day, a time of day, a location, a speed, an alert, a notification, a task schedule, a communication, a manual input.

17. The method of claim 11, wherein the trigger criteria include at least one of: whether the user of the computing device is determined to be driving, and whether the user of the computing device is determined to be exercising.

18. The method of claim 11, further comprising:
maintaining a user action history of events and resultant actions performed by the user; and
formulating additional trigger criteria based on the events and resultant actions.

19. A non-transitory computer readable medium storing a software program, the software program being executable to provide operations comprising:

providing an active user interface by a computing device, the active user interface configured to receive user input when a user of the computing device is not determined to be in a passive mode;

providing a proactive user interface by the computing device, the proactive user interface configured to selectively propose suggested actions when the user is determined to be in a passive mode; and when providing the proactive user interface:
waiting for at least one event;
determining whether trigger criteria are met based on the at least one event;
when the trigger criteria are met, proposing a suggested action to the user based on the at least one event; and
perform the suggested action if an affirmative response is received from the user.

20. The non-transitory computer readable medium of claim 19, wherein the operations further comprise:
monitoring activity of the computing device;
determining whether to provide the proactive user interface based on the monitored activity and mode criteria that specify conditions that, when satisfied, indicate that the user is in the passive mode;
providing the active user interface when the user is determined not to be in the passive mode; and
providing the proactive user interface when the user is determined to be in the passive mode.

21. The non-transitory computer readable medium of claim 19, wherein the operations further comprise:
maintaining a user action history of events and resultant actions performed by the user; and
formulating additional trigger criteria based on the events and resultant actions.

* * * * *